United States Patent
Nah et al.

(10) Patent No.: US 7,206,006 B2
(45) Date of Patent: Apr. 17, 2007

(54) REAL SIZE DISPLAY SYSTEM

(75) Inventors: Keun-Shik Nah, Incheon (KR);
Jin-Kwan Kim, Suwon (KR)

(73) Assignee: Samsung Electronics Co. Ltd.,
Suwon-Si (KR)

( * ) Notice: Subject to any disclaimer, the term of this patent is extended or adjusted under 35 U.S.C. 154(b) by 205 days.

(21) Appl. No.: 09/917,910

(22) Filed: Jul. 31, 2001

(65) Prior Publication Data

US 2002/0054048 A1    May 9, 2002

(30) Foreign Application Priority Data

Aug. 1, 2000    (KR) ............... 2000-44660

(51) Int. Cl.
*G09G 5/32* (2006.01)

(52) U.S. Cl. .................. 345/698; 345/660

(58) Field of Classification Search ............ 345/472, 345/472.1, 472.2, 788, 619, 173, 184, 698, 345/660
See application file for complete search history.

(56) References Cited

U.S. PATENT DOCUMENTS

| | | | | |
|---|---|---|---|---|
| 3,730,632 A | * | 5/1973 | Chikama | 356/636 |
| 4,787,739 A | * | 11/1988 | Gregory | 356/4.03 |
| 4,790,028 A | * | 12/1988 | Ramage | 382/298 |
| 5,144,685 A | * | 9/1992 | Nasar et al. | 382/153 |
| 5,630,105 A | * | 5/1997 | Itagaki | 345/501 |
| 5,850,271 A | * | 12/1998 | Kim et al. | 349/111 |
| 5,937,213 A | * | 8/1999 | Wakabayashi et al. | 396/50 |
| 5,967,968 A | * | 10/1999 | Nishioka | 600/117 |
| 5,986,670 A | * | 11/1999 | Dries et al. | 345/629 |
| 6,005,607 A | * | 12/1999 | Uomori et al. | 348/41 |
| 6,175,379 B1 | * | 1/2001 | Uomori et al. | 348/47 |
| 6,177,937 B1 | * | 1/2001 | Stockham et al. | 715/807 |
| 6,266,057 B1 | * | 7/2001 | Kuzunuki et al. | 715/745 |
| 6,388,639 B1 | * | 5/2002 | Hoshino et al. | 345/8 |
| 2002/0037489 A1 | * | 3/2002 | Jones et al. | 433/24 |
| 2002/0126161 A1 | * | 9/2002 | Kuzunuki et al. | 345/863 |

FOREIGN PATENT DOCUMENTS

| | | |
|---|---|---|
| EP | 1 102 475 A1 | 5/2001 |
| JP | 60114919 A * | 6/1985 |

(Continued)

OTHER PUBLICATIONS

Hiroyuki Hantano, "Image processing and database system in the national museum of western art: An integrated system for ar research" Aug. 20-25, 1995, 61st IFLA general conference.*

*Primary Examiner*—Kee M. Tung
*Assistant Examiner*—J. Amini
(74) *Attorney, Agent, or Firm*—F. Chau & Associates, LLC

(57) ABSTRACT

Disclosed is a real size display system comprising a real size display system comprising a photographing unit for photographing an image of a subject, and outputting first image information that includes measurement information of the subject; a flat panel display unit for displaying image and providing information on installed dot size; and an image converter for receiving the first image information, converting the first image information based on the dot size information received from the flat panel display unit, and outputting second image information, to the flat panel display unit.

14 Claims, 6 Drawing Sheets

FOREIGN PATENT DOCUMENTS

| | | | |
|---|---|---|---|
| JP | 03-099628 | | 4/1991 |
| JP | 04-077067 | | 3/1992 |
| JP | 8129375 | * | 5/1996 |
| JP | 08129375 A | * | 5/1996 |
| JP | 09049873 A | * | 2/1997 |
| JP | 09050358 A | * | 2/1997 |
| JP | 11344311 | | 12/1999 |
| TW | 90-425814 | | 3/2001 |

* cited by examiner

REAL SIZE DISPLAY SYSTEM

BACKGROUND OF THE INVENTION (a) Field of the Invention

The present invention relates to a real size display system, and more particularly, to a real size display system in which images appear on a digital display in actual sizes.

(b) Description of the Related Art

Great strides have been made in WYSIWYG (What You See Is What You Get) displays that show screen image very closely matching the appearance of printed output. That is, printed graphics and text, as well as colors can be printed in a manner closely resembling the appearance on the display screen.

There is also a need for WYSIWYG with respect to sizes of objects appearing on the screen corresponding to real-life sizes. Such applications are useful in various technical areas, such as medical research, where real size display offers substantial advantages.

However, a display size of images collected by a camera varies as a resolution of a display system changes, and there is no suitable way to solve such a problem.

SUMMARY OF THE INVENTION

The present invention has been made in an effort to solve the above problems.

It is an object of the present invention to provide a real size display system in which images appear on a digital display in actual sizes when an actual scale option is selected.

To achieve the above object, the present invention provides a real size display system comprising a photographing unit for photographing an image of a subject, and outputting first image information which includes measured information of the subject; a flat panel display unit for outputting information of installed dot size; and an image converter for receiving the first image information, converting the first image information based on the dot size information received from the flat panel display unit, and outputting second image information, which is linked to the flat panel display unit, to the flat panel display unit.

According to a feature of the present invention, the first image information includes magnification, horizontal synchronization signal, vertical synchronization signal, clock and measured distance data.

According to another feature of the present invention, the flat panel display system includes control means for enabling magnification adjustment of the second image, thereby enabling real size display as desired by the user.

According to yet another feature of the present invention, the image converter extracts an R component, G component, and B component from first image information, which is an RGB synthesized signal, then converts the R, G, B image signals extracted based on dot size information provided from the display unit, and outputs the converted signals (i.e., the second image information) to the display unit.

BRIEF DESCRIPTION OF THE DRAWINGS

The accompanying drawings, which are incorporated in and constitute a part of the specification, illustrate an embodiment of the invention, and, together with the description, serve to explain the principles of the invention.

DETAILED DESCRIPTION OF THE PREFERRED EMBODIMENTS

Preferred embodiments of the present invention will now be described in detail with reference to the accompanying drawings.

Figure 1:
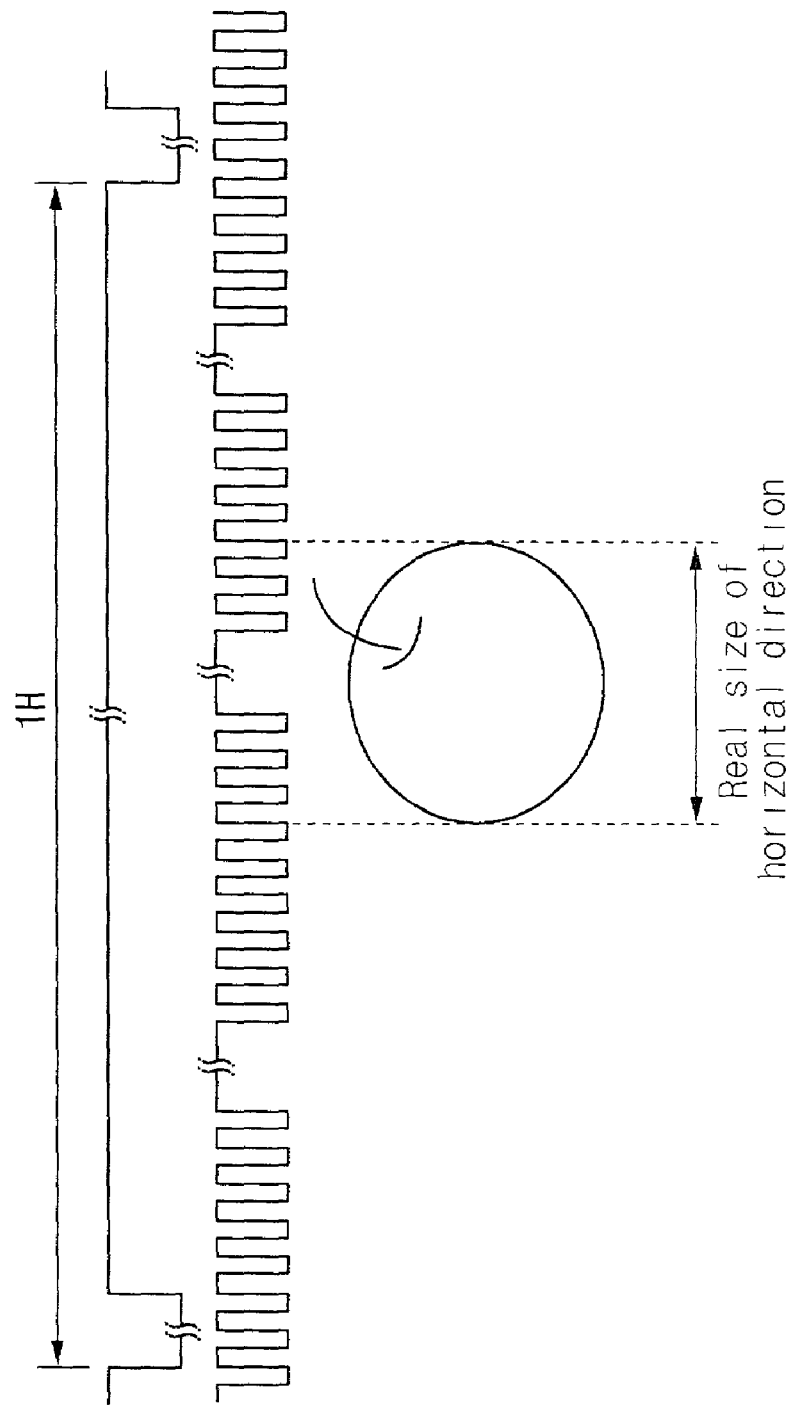
FIGS. 1 and 2 are schematic views for describing a quantized data scan of a size of an object respectively in horizontal and vertical direction.
Figure 2:
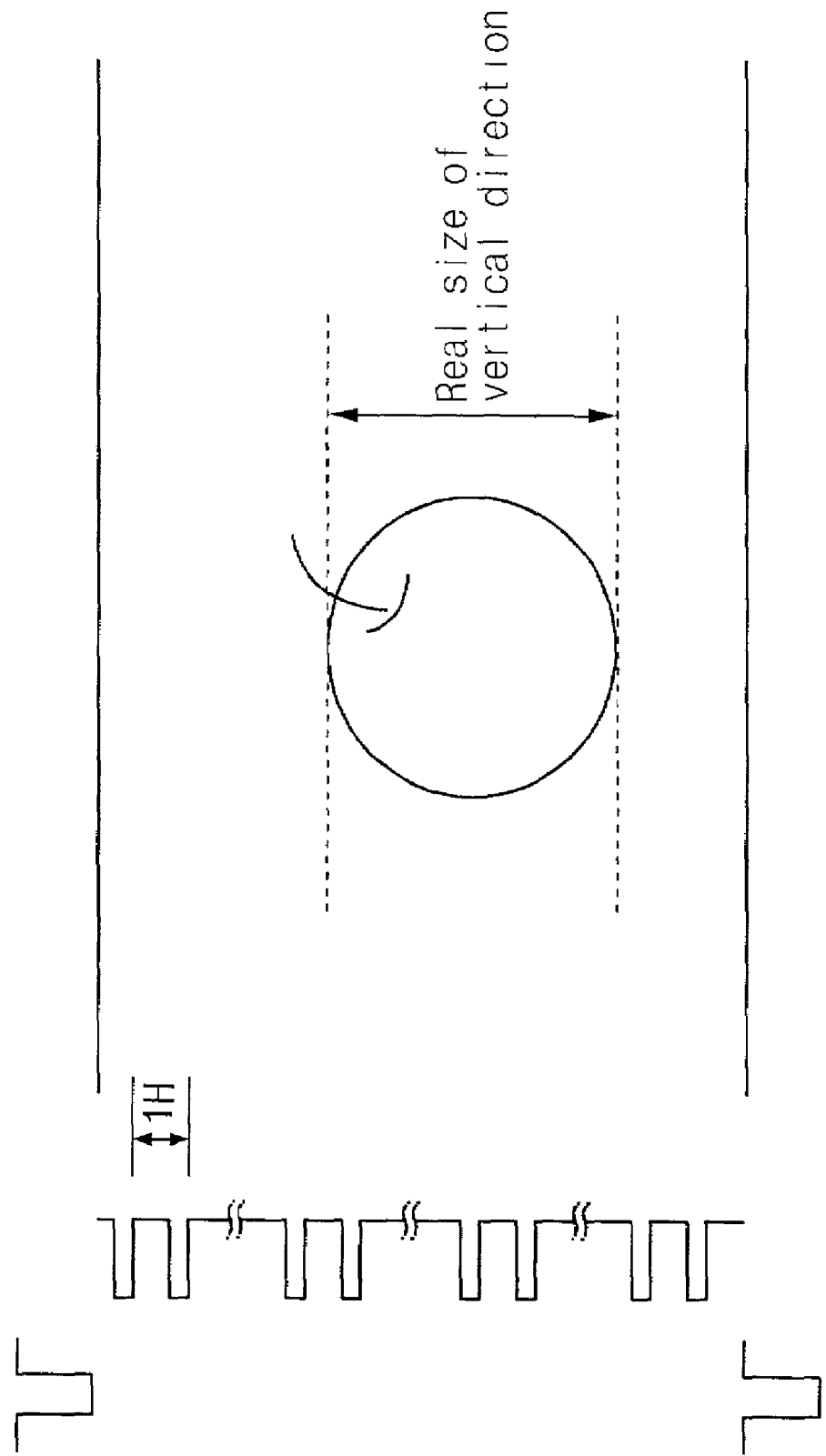

FIGS. 1 and 2 are schematic views for describing a quantized data scan of a size of an object respectively in horizontal and vertical direction.

Referring first to FIG. 1, assuming that, among various pixel clocks, a first clock corresponding to 1H scans 1 mm of data, when scanning an object that is 10 cm in the horizontal direction, 100 clocks display the horizontal length of the object (100×1 mm=10 cm). Thus, the size in the horizontal direction is quantized as a number of horizontal synchronization signals Hsync per frame in the horizontal direction to perform scanning of the data. Further, with reference to FIG. 2, using the same method, a size of an object in the vertical direction is quantized as a number of horizontal synchronization signals Hsync per frame in the vertical direction to perform scanning of data.

Figure 3:
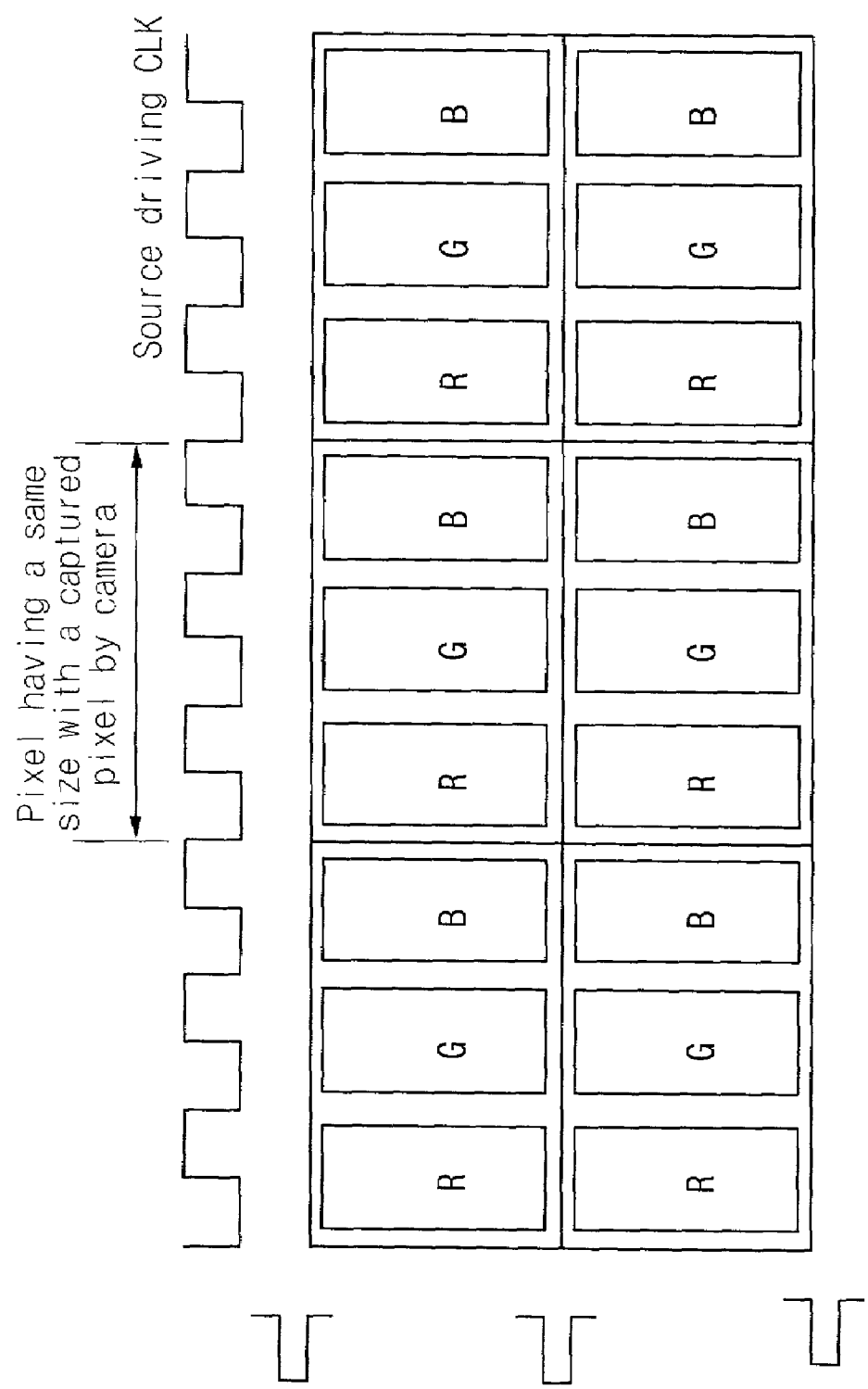
FIG. 3 is a view showing a relation between three RGB pixels and a clock forming a single pixel dot.

FIG. 3 is a view showing a relation between three RGB pixels and a clock forming a single pixel dot.

As shown in the drawings, a pixel size is an important factor for displaying the real size of an object in a digital display device. Thus, converting means must be able to use pixel size information stored in a microcomputer, timing controller, and so on. That is, horizontal/vertical clocks must be changed in accordance with the size of RGB pixels.

Figure 4:
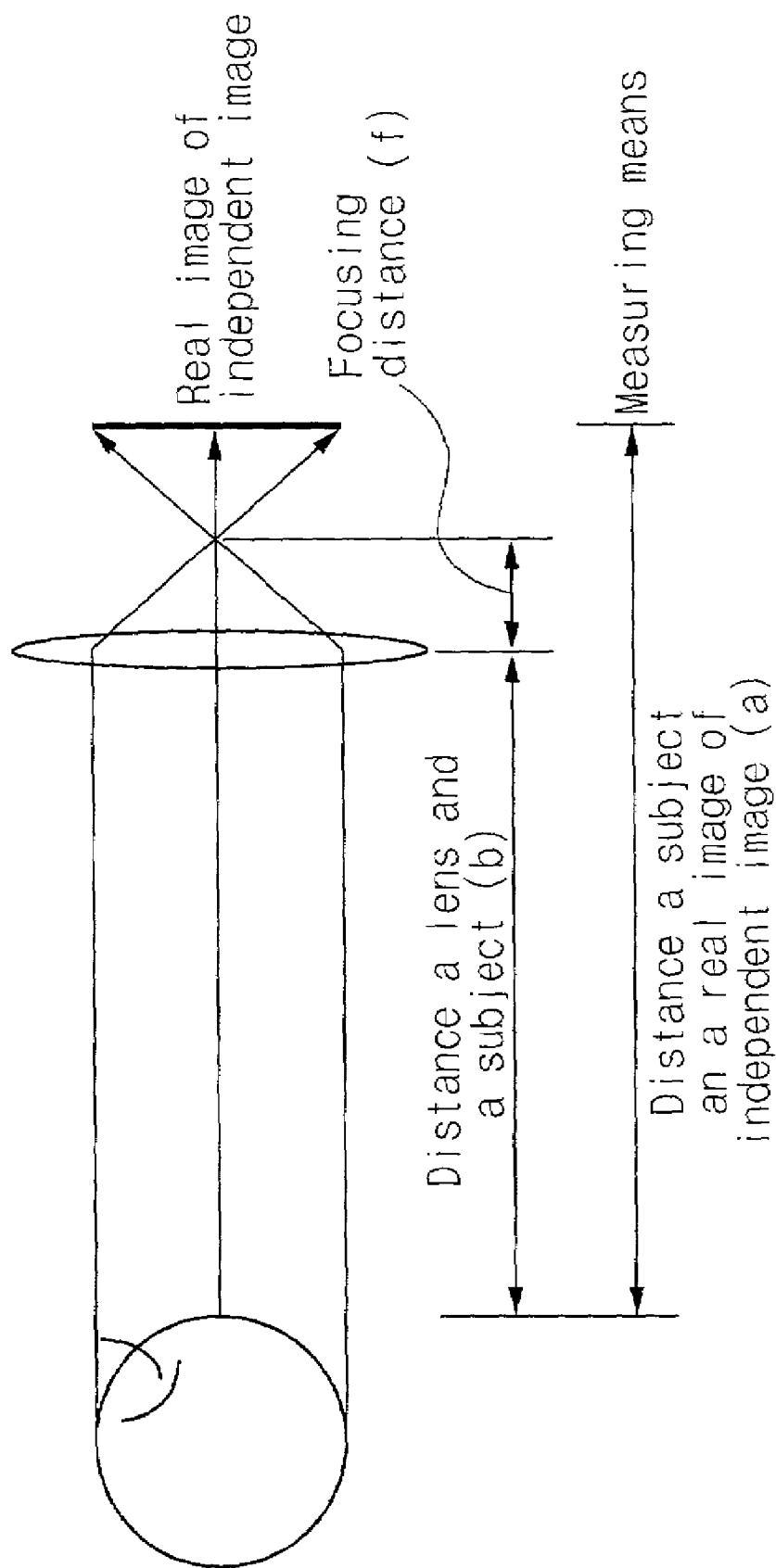
FIG. 4 is a view for describing basic principles of independent images of a convex lens.

FIG. 4 is a view for describing basic principles of independent images of a convex lens.

As shown in the drawing, a distance between a subject and an image has the relationship of $1/a+1/b=2/f$, and can be measured using lasers, ultrasonic waves, etc. That is, taking into account a magnification of a lens and distance, the actual size of a subject is measured. Display data are generated based on such measurements. The display data include a scanning width of each clock, and a number of horizontal synchronization signals Hsync and vertical synchronization signals Vsync.

An image size converter is provided separately or may be mounted to the digital display. It is positioned at the same functional sequence as an expansion engine or a data reduction algorithm. The image size converter performs an identical function of improved clock converting, expansion, data reduction, pixel fitting, etc., and then transmits data to a flat panel display panel. Pixel fitting involves the conversion of a pixel size of the flat panel display panel and an actual scan width of a camera scan pulse in order to correspond these two parameters.

Although a measurement standard can be attached to the measured display data to maintain actual size information in a JPG or BMP file, in order to obtain the display in actual size on an LCD panel, the above processes of using a converting algorithm and pixel fitting must be performed.

Figure 5:
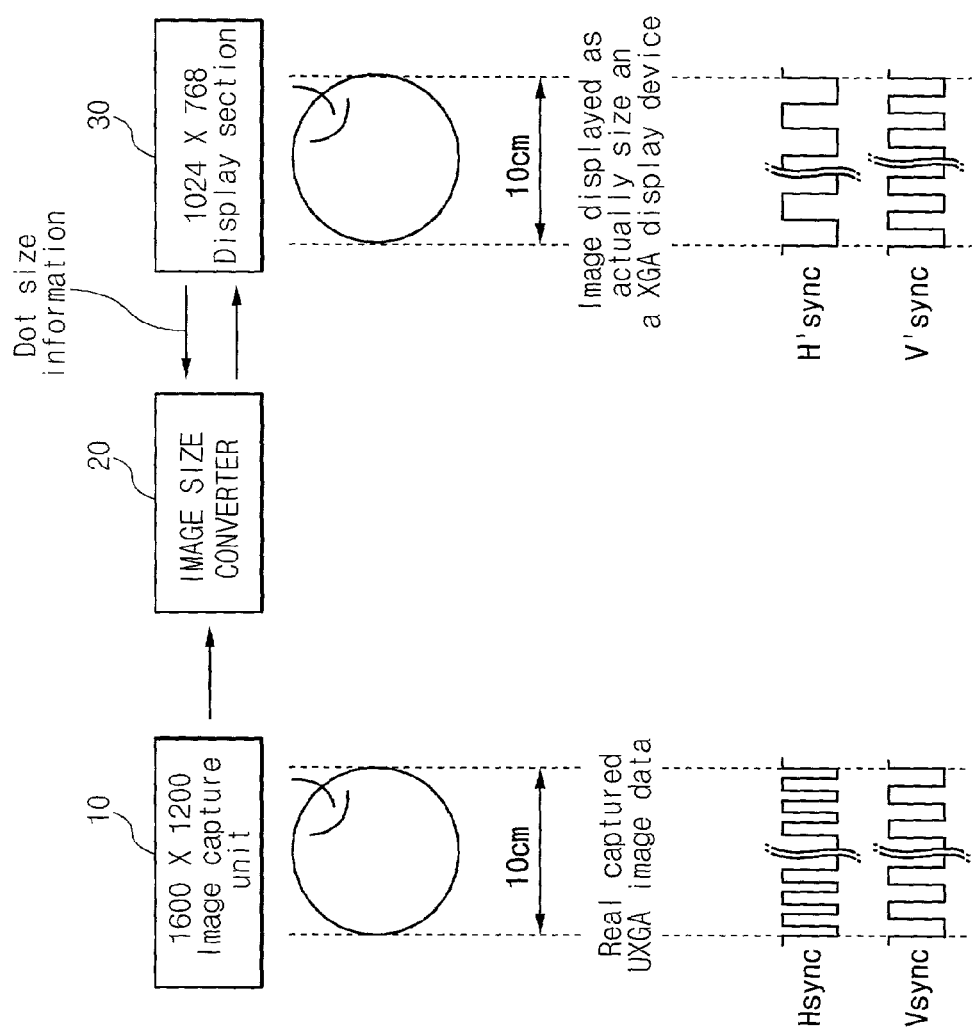
FIG. 5 is a view for describing in detail an image size converter function according to a preferred embodiment of the present invention.

FIG. 5 is a view for describing in detail an image size converter function according to a preferred embodiment of the present invention.

With reference to the drawing, an image capture unit 10 having a 1600×1200 resolution (UXGA) outputs real captured UXGA image data to an image size converter 20. The real captured UXGA image data includes a distance value to a subject and a corresponding magnification, an actual scan distance for every pixel clock, a first horizontal synchronization signal Hsync, and a first vertical synchronization signal Vsync.

The image size converter 20 converts real captured UXGA image data based on dot size information of a display unit 30, then provides the data to the display unit 30. The display unit 30 has a 1024×768 resolution (XGA). For example, an image, which is converted based on dot size information, of 1024×768 resolution (XGA) including a second horizontal synchronization signal H'sync and a second vertical synchronization signal V'sync is displayed.

However, the repeated conversion of image data by the image size converter 20 may result in increased errors. To prevent this, camera display data, the first horizontal synchronization signal Hsync, the first vertical synchronization signal Vsync, and clock and clock width information are discharged such that the error in the actual size is limited even when data conversions are repeated.

With reference to FIG. 5, in magnification with respect to a distance between the subject and image, since a horizontal direction 1600 of the first resolution (UXGA) of the measured image must be converted to a horizontal direction 1024 of the second resolution (XGA) while the actual size is not changed, a conversion operation is performed in the converter such that a 1 mm/clk is converted to 1 mm×1600/1024 for every clock in the first resolution (UXGA) to enable display.

Further, since RGB data is synthesized and input in the image information provided by the image capture unit 10, and each RGB cell formed in a single image dot and displayed in the display unit 30, an R component, G component, and B component are extracted from first image information, which is a RGB synthesized signal. The R, G, B image signals extracted based on dot size information provided from the display unit 30 are converted and output to the display unit 30. Here, since each RGB cell is formed in a single image dot, a data signal transmission clock and a pixel frequency exist in a 3:1 ratio.

In a flat panel display monitor such as a LCD or PDP, data of the size of each dot are installed in the image size converter 20 to compare the size data with input signals. This allows the conversion that is directly corresponding to actual size when displayed. For example, if the cell size of each of the R, G, and B is 0.3, since a single image dot results in 0.9, conversion to 1 mm/0.9/clk is performed before display, assuming scanning of a subject by the camera is based on 1 mm/clk.

Figure 6:
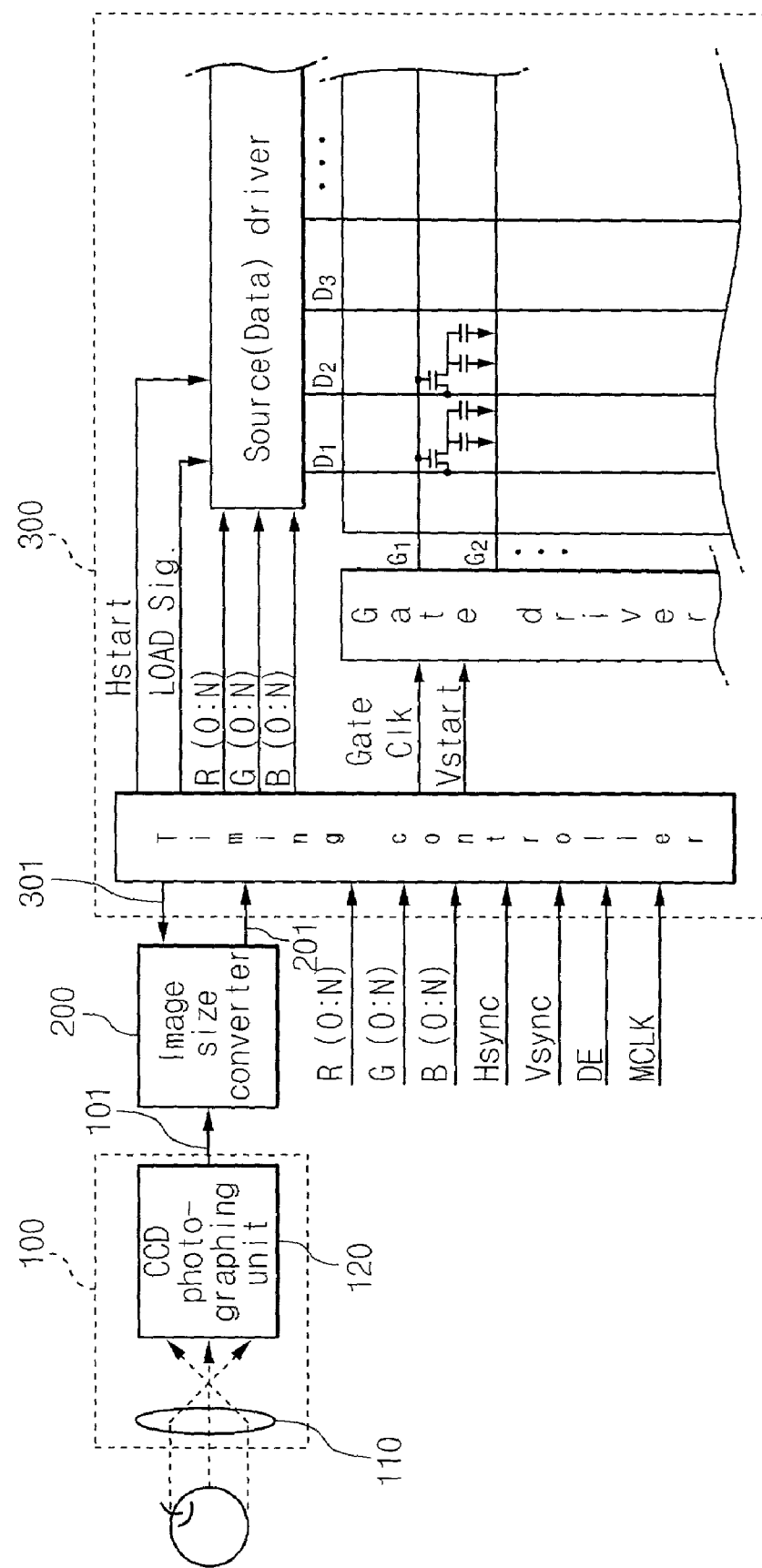
FIG. 6 is a schematic view of a real size display system according to a preferred embodiment of the present invention.

FIG. 6 shows a schematic view of a real size display system according to a preferred embodiment of the present invention.

As shown in FIG. 6, the real size display system includes an image capture unit 100, an image size converter 200, and an LCD module 300. The image capture unit 100 includes a camera lens 110 for converting incident images to a predetermined size, a CCD photographing unit 120 for photographing the images converted by the camera lens 110, and an electronic shutter (not shown) for controlling the amount of incident light. The images photographed by the CCD photographing unit 120 are photographed according to a shutter speed of the electronic shutter, then the photographed images are output to an A/D converter (not shown).

The A/D converter receives analog image signals from the CCD photographing unit 120 and converts the signals to digital image data 101. Next, the digital image data 101 are output to the image size converter 200. Here, the CCD photographing unit 120, with reference to FIG. 4, measures a distance between a subject and image through various measuring methods such as laser and ultrasonic wave. The measured distance data are output to the image size converter 200.

The LCD module 300 provides dot size information 301 to the image size converter 200, and receives measured image information 201 converted based on the dot size information 301, after which the LCD module 300 performs display. Since a conventional LCD panel is used in the preferred embodiment of the present invention, a detailed description thereof will not be provided. However, the storage of the dot size information and supply of the same to the image converter 200 are one of the features in the present invention. Preferably, this is performed by a timing controller.

Also, it is possible to provide a button externally on the LCD module 300 to enable user control of real size display. This can also be realized through a touch-operated icon appearing on the screen of the LCD module 300. It is possible to allow resolution and magnification control through these controls. Although the preferred embodiment of the present invention is described in context to application to a LCD panel, it also possible to apply the present invention to other display configurations such as PDPs, ELs, and FEDs.

The image size converter 200 converts image information based on the dot size information 301 supplied from the LCD module 300, and the converted image information 201 is output to the LCD module 300.

A camera means is described above. However, it is possible to exclude the camera means and provide the measured image information to the image converter 200.

The real size display system of the present invention described above is useful in many areas such as remote diagnosis and surgery, and for various technical and military applications.

Although preferred embodiments of the present invention have been described in detail hereinabove, it should be clearly understood that many variations and/or modifications of the basic inventive concepts herein taught which may appear to those skilled in the present art will still fall within the spirit and scope of the present invention, as defined in the appended claims.

What is claimed is:

1. A real size display system, comprising
  a flat panel display unit including a plurality of dots for displaying image information and providing information on a size of the dots; and
  an image converter that receives first image information, converts the first image information into second image information and outputs the second image information to the flat panel display unit,
  wherein the first image information includes measurement information on an actual size of an object described by the first image information, and wherein the image converter scales the first image information into the second image information based on the dot size information received from the flat panel display unit.

2. The real size display system according to claim 1, wherein the first image information includes magnification, horizontal synchronization signal, vertical synchronization signal, clock and measured distance data.

3. The real size display system according to claim 1, wherein the flat panel display system includes a controller that enables magnification adjustment of the second image information, thereby enabling real size display as desired by a user.

4. The real size display system according to claim 1, wherein the image converter extracts an R component, G component, and B component from the first image information, then converts the extracted R, G, B image signals based on the dot size information provided from the display unit, and outputs the second image information to the flat panel display unit.

5. A real size display system, comprising:
a photographing unit for photographing an image of a subject, and outputting first image information that includes measurement information on an actual size of the subject;
a flat panel display unit including a plurality of dots for displaying image information and providing information on a size of the dots; and
an image converter that receives the first image information, converts the first image information into second image information and outputs the second information to the flat panel display unit,
wherein the image converter scales the first image information into the second image information based on the dot size information received from the flat panel display unit.

6. The real size display system according to claim 5, wherein the first image information includes magnification, horizontal synchronization signal, vertical synchronization signal, clock and measured distance data.

7. The real size display system according to claim 5, wherein the flat panel display system includes a controller that enables magnification adjustment of the second image information, thereby enabling real size display as desired by a user.

8. The real size display system according to claim 5, wherein the image converter extracts an R component, G component, and B component from the first image information, then converts the extracted R, G, B image signals based on the dot size information provided from the display unit, and outputs the second image information to the flat panel display unit.

9. The real size display system according to claim 1, wherein a real size of a subject of the first image information and the second image information is measured to generate the measurement information.

10. The real size display system according to claim 9, wherein the flat panel display unit uses the second image information to display an image of the subject and a size of the displayed subject is the real size of the subject.

11. The real size display system according to claim 5, wherein a distance between the subject and the image of the subject is measured to generate the measurement information.

12. The real size display system according to claim 10, wherein the flat panel display unit uses the second image information to display a second image of the subject and a size of the displayed subject is the real size of the subject.

13. The real size display system according to claim 1, wherein the flat panel display unit comprises at least one of a button, a switch, a touch-operated icon on a screen of the flat panel display for enabling real-size display operation.

14. The real size display system according to claim 5, wherein the flat panel display unit comprises at least one of a button, a switch, a touch-operated icon on a screen of the flat panel display for enabling real-size display operation.

* * * * *